(12) United States Patent
Igarashi et al.

(10) Patent No.: US 10,843,334 B2
(45) Date of Patent: Nov. 24, 2020

(54) MECHANICAL STOPPER DEVICE AND ROBOT

(71) Applicant: Kobe Steel, Ltd., Kobe (JP)

(72) Inventors: Taichi Igarashi, Fujisawa (JP); Yuki Shika, Ibaraki (JP); Motoaki Murakami, Fujisawa (JP); Yasuharu Sakurai, Fujisawa (JP); Tatsuji Minato, Fujisawa (JP)

(73) Assignee: Kobe Steel, Ltd., Kobe (JP)

( * ) Notice: Subject to any disclaimer, the term of this patent is extended or adjusted under 35 U.S.C. 154(b) by 0 days.

(21) Appl. No.: 16/323,275

(22) PCT Filed: Sep. 8, 2017

(86) PCT No.: PCT/JP2017/032464
§ 371 (c)(1),
(2) Date: Feb. 5, 2019

(87) PCT Pub. No.: WO2018/051915
PCT Pub. Date: Mar. 22, 2018

(65) Prior Publication Data
US 2020/0189126 A1    Jun. 18, 2020

(30) Foreign Application Priority Data
Sep. 16, 2016    (JP) .................. 2016-182145

(51) Int. Cl.
*B25J 9/10* (2006.01)
*B25J 19/00* (2006.01)
*G05G 5/04* (2006.01)

(52) U.S. Cl.
CPC .............. *B25J 9/101* (2013.01); *B25J 19/00* (2013.01); *G05G 5/04* (2013.01)

(58) Field of Classification Search
CPC ... B25J 9/0009; B25J 9/10; B25J 9/101; B25J 17/02; B25J 19/00; B25J 19/0004; B25J 19/0091; G05G 5/04; G05G 5/06
See application file for complete search history.

(56) References Cited

U.S. PATENT DOCUMENTS

| 2,940,564 A | * | 6/1960 | Judd ..................... G05G 5/06 |
| | | | 192/223 |
| 4,606,667 A | * | 8/1986 | Bailey ................ B23Q 16/008 |
| | | | 192/149 |

(Continued)

FOREIGN PATENT DOCUMENTS

| JP | 2-232191 A | 9/1990 |
| JP | 7-136972 A | 5/1995 |

(Continued)

OTHER PUBLICATIONS

International Search Report dated Nov. 28, 2017 in PCT/JP2017/032464 filed on Sep. 8, 2017.

*Primary Examiner* — Adam D Rogers
(74) *Attorney, Agent, or Firm* — Oblon, McClelland, Maier & Neustadt, L.L.P.

(57) ABSTRACT

A mechanical stopper device wherein a fixed body includes a fixing-side stopper, including: a lever that can swing about a supporting shaft provided to the fixed body; and a pair of elastic bodies, attached to the fixed body, on both sides in the lever swinging direction, and which can contact with both side surfaces of the lever. Further, a rotating body includes a stopper pin that can be in contact with both the side surfaces of the lever. The ratio between a distance (a) from a supporting point of the lever to a contact position where the lever and the stopper pin are in contact with each other, and a distance (b) from the supporting point of the lever to a contact position where the lever and the elastic bodies are (Continued)

in contact with each other is $1.05 \leq a/b \leq 2.30$, and thickness (D) of the elastic bodies is $20 \text{ mm} \leq D \leq 40 \text{ mm}$.

8 Claims, 3 Drawing Sheets

(56) References Cited

U.S. PATENT DOCUMENTS

| | | | | |
|---|---|---|---|---|
| 5,193,658 | A * | 3/1993 | Tellden | B25J 9/101 |
| | | | | 192/138 |
| 6,065,364 | A | 5/2000 | Shiraki et al. | |
| 8,763,488 | B2 * | 7/2014 | Reekers | B25J 9/101 |
| | | | | 403/116 |
| 8,978,509 | B2 * | 3/2015 | Pan | B25J 9/101 |
| | | | | 74/490.05 |
| 9,796,098 | B2 * | 10/2017 | Ootani | B25J 19/00 |
| 2005/0204849 | A1 | 9/2005 | Yamamoto et al. | |

FOREIGN PATENT DOCUMENTS

| | | |
|---|---|---|
| JP | 10-225890 A | 8/1998 |
| JP | 2005-246516 A | 9/2005 |
| JP | 2006-68886 A | 3/2006 |
| WO | WO 97/10933 A1 | 3/1997 |

\* cited by examiner

MECHANICAL STOPPER DEVICE AND ROBOT

TECHNICAL FIELD

The present invention relates to a mechanical stopper device and a robot, and in more detail, relates to a mechanical stopper device that regulates a rotation angle of a rotating body in a multi-joint industrial robot, and a robot including the mechanical stopper device.

BACKGROUND ART

Conventionally, between a rotating body and a fixed body of a device having a rotation drive portion, a mechanical stopper device serving as a safety device that prevents breakage of other equipment, etc. is provided. In a multi-joint industrial robot having a rotation drive portion, a wire is often required on the rotation axis. When a rotating body is capable of rotating without limitation, the wire is twisted and breakage of the wire occurs.

For prevention of mechanical damage due to such unlimited rotation, control of a rotation range by a mechanical stopper device is useful. For example, in Patent Document 1, in a stopper device for setting a rotation amount provided in a rotation axis portion of an industrial robot, etc., a rotation setting limit can be set exceeding 360°. In Patent Document 2, in order to prevent damage to a mechanical part such as a reducer generated by excessive impact force acting on the mechanical part, a stopper device that inhibits rotation of a drive motor of a revolving shaft at a stroke end by using a detection means is provided. In Patent Document 3, in order to suppress generation of wear powder to which no countermeasures are provided in Patent Documents 1 and 2 having a sliding portion in the mechanical stopper device, a stopper device in which one of contact pieces is abutted with a band-shaped elastic body so as to stop rotation of one of members is disclosed.

CITATION LIST

Patent Document

Patent Document 1: JP 07-136972 A
Patent Document 2: JP 10-225890 A
Patent Document 3: JP 2005-246516 A

SUMMARY OF THE INVENTION

Problems to be Solved by the Invention

In a case where excessive rotation due to troubles such as runaway, etc., speed of the rotation is very high and an impact on the mechanical stopper device itself becomes excessive. In a case of an industrial robot, by inertia force applied at the time of an impact, an excessive load is applied not only to the mechanical stopper device but also to an end effector on a leading end of the robot. Thus, there is a possibility that a failure or origin displacement occurs. In particular, in a case of an industrial robot used for welding, when the origin displacement occurs, aiming displacement of a welding position occurs, and origin correction is required. However, Patent Documents 1 to 3 do not mention damage to an end effector, and a countermeasure against an impact in consideration with this point is desired.

Since the sliding portion exists in the Patent Documents 1 and 2, there is a possibility that the sliding portion such as a slider is worn away, or an elastic body such as rubber and a spring is damaged by excessive impact force. In Patent Document 3, since a commercially-available timing belt is used as the elastic body of the stopper, there is a possibility that the elastic body is broken off depending on impact force. Therefore, the life of the mechanical stopper device is reduced, and replacement is sometimes required after use for a few times.

The present invention is achieved in consideration with the above problem, and an object thereof is to provide a mechanical stopper device that more reliably prevents damage to an industrial robot (an end effector in particular) and the mechanical stopper device itself, and a robot in which the mechanical stopper device is used.

Means for Solving the Problem

The object of the present invention is achieved by the following configurations.

(1) A mechanical stopper device provided between a fixed body and a rotating body to rotate with respect to the fixed body about the rotation axis, wherein the fixed body includes a fixed side stopper having a lever capable of swinging about a fulcrum which is provided in the fixed body, and a pair of elastic bodies attached to the fixed body on both the sides of the swinging direction of the lever, the elastic bodies being capable of being abutted with both side surfaces in the swinging direction of the lever, the rotating body includes a movable side stopper capable of being abutted with both the side surfaces of the lever, a ratio between a distance a from the fulcrum of the lever to an abutment position between the lever and the movable side stopper, and a distance b from the fulcrum of the lever and an abutment position between the lever and each of the elastic bodies is $1.05 \leq a/b \leq 2.30$, and thickness D of the elastic body is $20 \text{ mm} \leq D \leq 40 \text{ mm}$.

(2) The mechanical stopper device according to (1), wherein a contact area between the lever and the elastic body is 300 to 3,000 $mm^2$.

(3) The mechanical stopper device according to (1) or (2), wherein hardness of a contact portion of the lever to be abutted with the elastic body is more than the elastic body.

(4) The mechanical stopper device according to any one of (1) to (3), wherein a movable range of the lever is 50 to 90°, and the lever is abutted with the elastic body within the movable range of the lever.

(5) A robot, wherein the mechanical stopper device according to any one of (1) to (4) is arranged between a base portion of the robot serving as the fixed body, and a revolving trunk serving as the rotating body.

Effect of the Invention

With the mechanical stopper device according to the present invention, the fixed body includes the fixed side stopper having the lever capable of swinging about the fulcrum which is provided in the fixed body, and the pair of elastic bodies attached to the fixed body on both the sides of the swinging direction of the lever, the elastic bodies being capable of being abutted with both the side surfaces in the swinging direction of the lever, and the rotating body includes the movable side stopper capable of being abutted with both the side surfaces of the lever. The ratio between the distance a from the fulcrum of the lever to the abutment position between the lever and the movable side stopper, and the distance b from the fulcrum of the lever to the abutment position between the lever and each of the elastic bodies is $1.05 \leq a/b \leq 2.30$, and the thickness D of the elastic body is 20 mm≤D≤40 mm. Thus, by properly setting the ratio of a/b, while ensuring a running distance of the rotating body, it is possible to absorb impact force by the elastic body having proper thickness so as to more reliably prevent damage to an industrial robot, and to improve the life of the mechanical stopper device itself.

The above mechanical stopper device is arranged between the base portion and the revolving trunk of the robot. Thus, it is possible to reduce an excessive load applied to an end effector such as a welding torch installed on a leading end of the robot, so as to reliably prevent a failure or origin displacement of the end effector.

DESCRIPTION OF EMBODIMENTS

Hereinafter, an embodiment of a mechanical stopper device and an industrial robot including the mechanical stopper device according to the present invention will be described in detail with reference to the drawings. In the following description, a welding robot serving as an example of an industrial robot will be described. However, the present invention is not limited to the welding robot but can be applied to various robots.

Figure 1:
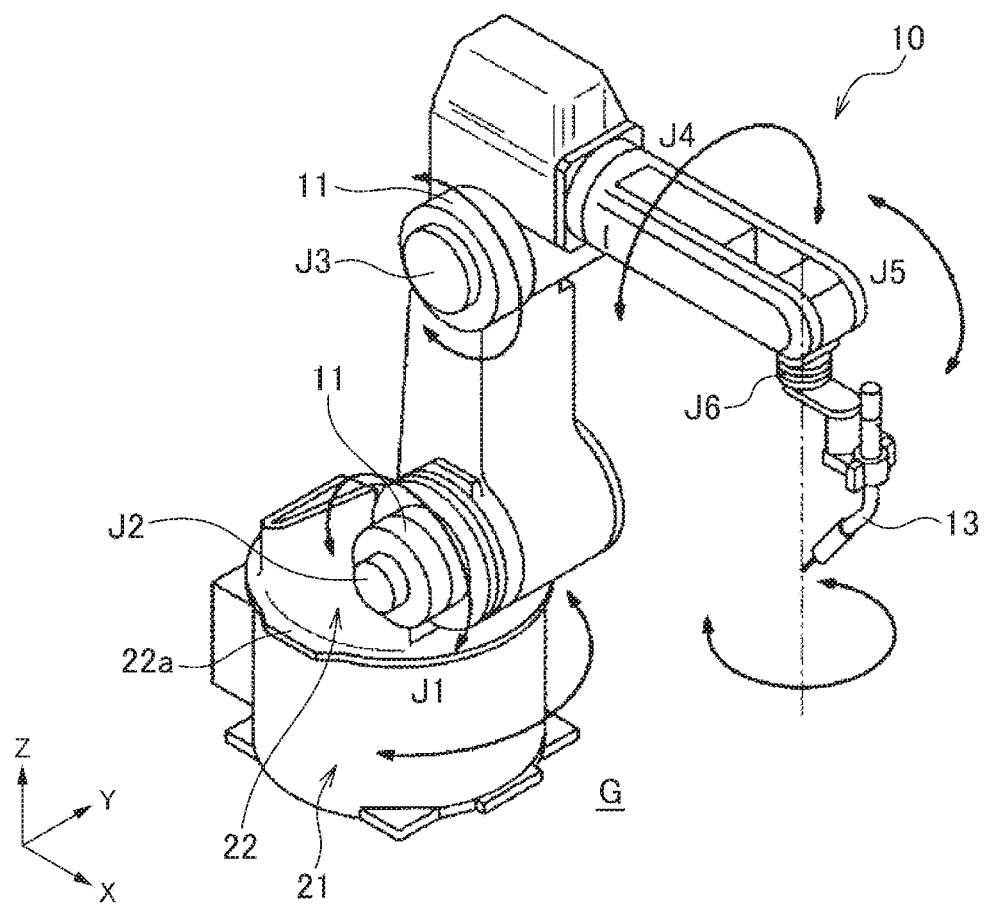
FIG. 1 is a perspective view of an industrial robot of an embodiment including a mechanical stopper device according to the present invention.

As shown in FIG. 1, a multi-joint welding robot 10 (hereinafter, also simply referred to as the robot) according to the present embodiment has six joint portions of first to sixth shafts J1 to J6. Each of the shafts J1 to J6 includes a drive motor 11 for driving the shaft. The drive motor 11 is, for example, a servomotor, controlled by a command from a control device connected via a communication wire (not shown). Thereby, rotation angles of the shafts J1 to J6 are controlled, and a welding torch 13 serving as an end effector of the welding robot 10 moves along a pre-programmed trajectory and performs welding to a required part.

In the welding robot 10, a wire feeding device (not shown) that feeds a consumable electrode (hereinafter, referred to as the welding wire) to the welding torch 13 is mounted and connected to the control device by a communication wire. The wire feeding device controls feeding speed of the welding wire according to a command signal of the control device. Further, a shielding gas is supplied to the welding torch 13 from a supply device (not shown), so as to protect entrainment of the atmosphere at the time of welding.

Figure 2:
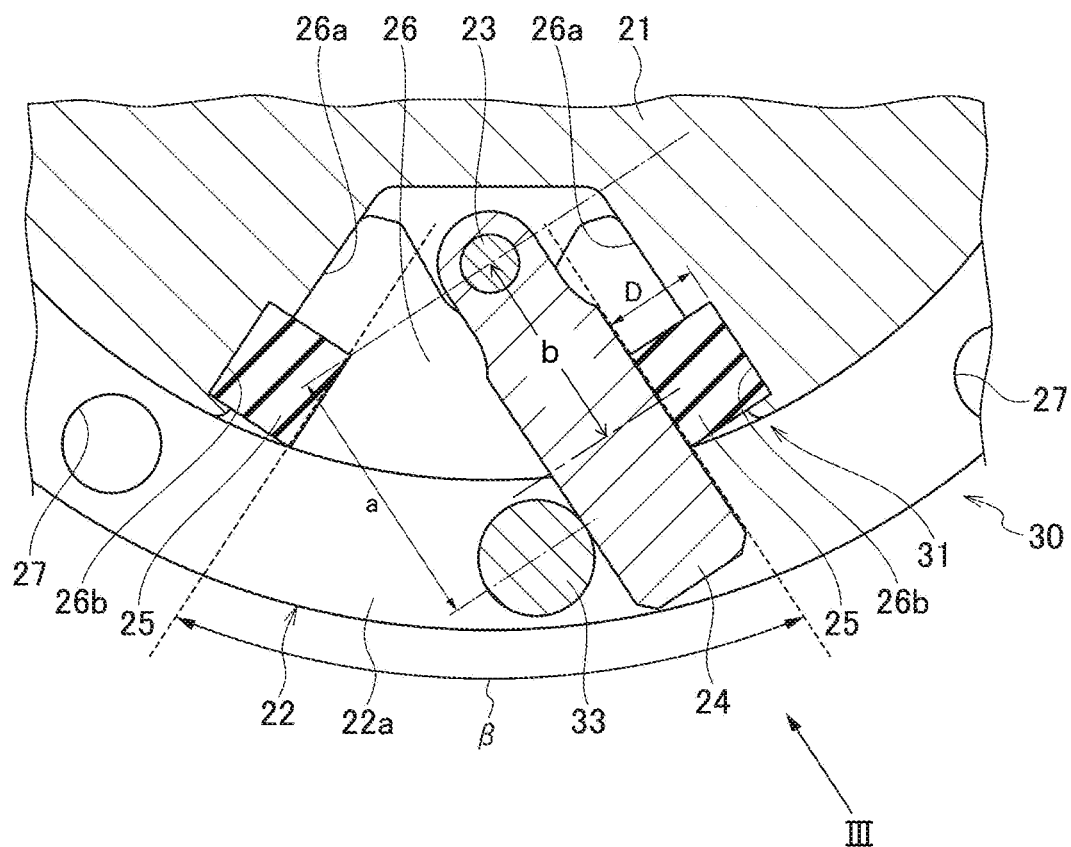
FIG. 2 is a sectional view of the mechanical stopper device.
Figure 3:
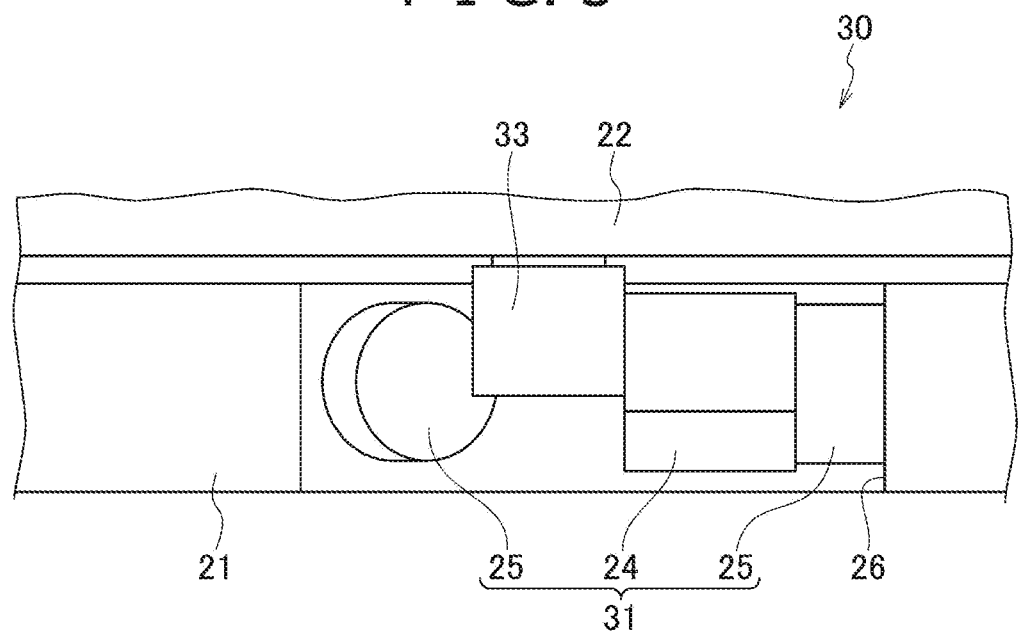
FIG. 3 is a side view seen from the III direction of FIG. 2.

Hereinafter, a mechanical stopper device arranged in the first shaft J1 will be taken as an example and described in detail. FIG. 2 is a sectional view of the mechanical stopper device arranged in the first shaft J1. FIG. 3 is a side view seen from the III direction of FIG. 2. The first shaft J1 includes a shaft-shaped base portion 21 serving as a fixed body fixed onto an installment surface G, and a revolving trunk 22 serving as a rotating body, the revolving trunk being turnably supported on the shaft-shaped base portion 21 and having a flange portion 22a which has a larger outer diameter than an outer peripheral surface of the base portion 21. A mechanical stopper device 30 is arranged between the base portion 21 and the revolving trunk 22. The mechanical stopper device 30 limits a turning range of the revolving trunk 22 with respect to the base portion 21.

The mechanical stopper device 30 includes a fixed side stopper 31 arranged in the base portion 21, and a stopper pin 33 serving as a movable side stopper arranged in the revolving trunk 22. The fixed side stopper 31 includes a lever 24, and a pair of elastic bodies 25. The base portion 21 has a lever chamber 26 which is a space formed by cutting out part of the base portion into a substantially fan shape toward the outer peripheral side. The lever 24 is arranged swingably in the lever chamber 26.

Figure 4:
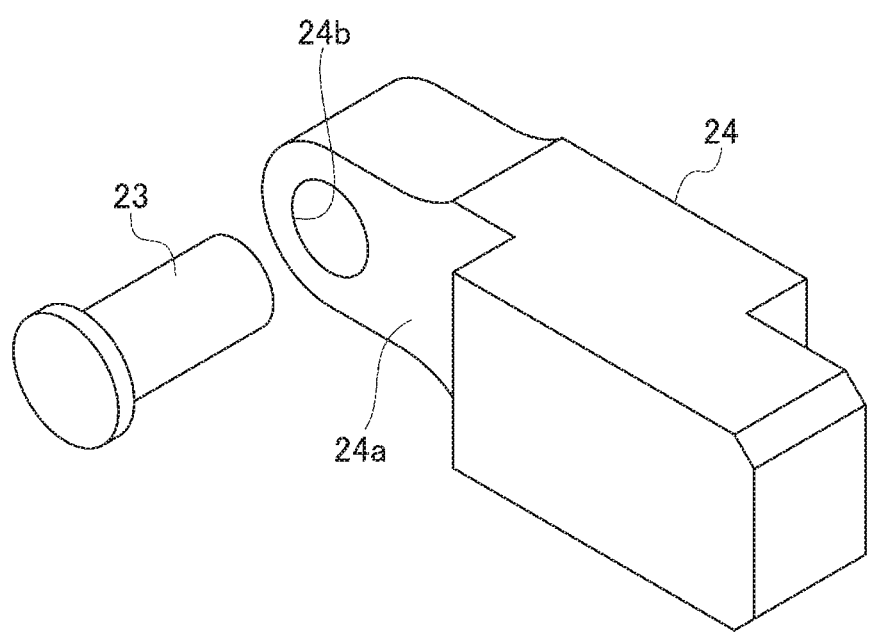
FIG. 4 is a perspective view of a lever.

As shown in FIG. 4, the lever 24 has a step portion 24a provided on the one surface side, and a support hole 24b formed in the step portion 24a. By fixing a flanged support shaft 23 inserted into the support hole 24b to the base portion 21, the lever 24 is supported swingably about the support shaft 23 parallel to the first shaft J1 which serves as the rotation axis.

Back to FIG. 2, length of the lever 24 is such length that a leading end of the lever projects out of the outer peripheral surface of the base portion 21 to the outer diameter side. The pair of elastic bodies 25 capable of being abutted with the lever 24 upon the lever 24 swinging is fixed to both side walls 26a of the lever chamber 26. Each of the elastic bodies 25 is formed in a columnar shape in which a shape of a colliding surface is a circular shape, projects from a recessed groove 26b formed in each of the side walls 26a, and one end surface of the elastic body is fixed into the recessed groove 26b by screwing.

Preferably, the lever 24 and the elastic body 25 are arranged so that flat surface portions are abutted with each other.

In the fixed side stopper 31 formed in such a way, a movable range (swinging range) ß of the lever 24 in the lever chamber 26 is limited to 50° to 90°.

A material of the lever 24 is anything and includes resin and metal. A material different from the material of the lever 24 may be attached to a contact surface on the lever 24 side to be brought into contact with the elastic body 25. For example, by attaching rubber only to the contact surface with the elastic body 25, it is possible to improve durability of the lever 24 itself.

Further, preferably, regarding hardness of the contact surface of the lever 24 and hardness of the elastic body 25, the hardness of the contact surface on the lever 24 side is more. Thereby, when the lever 24 is abutted with the elastic body 25, the elastic body 25 is stopped while being elastically deformed, so that radical braking is suppressed, and it is possible to ensure a running distance of the revolving trunk 22.

A material of the elastic body 25 is anything and rubber and a spring can be used. From a viewpoint of durability, rubber is more preferably used. As rubber, for example, natural rubber, acrylic rubber, and urethane can be used. From a viewpoint of mechanical properties such as rebound resistance and wear resistance, urethane rubber is more preferable. Preferably, hardness of rubber is within a range from A10 to A100 (JIS K 6253 durometer A). Rubber is not limited to one type but plural types of rubber may be overlapped. In that case, softer rubber is preferably arranged on the side of a contact surface with the lever 24.

The stopper pin 33 has a circular section, and is fixed at a position above the revolving trunk 22 (specifically, a position of the flange portion 22a) where the stopper pin is capable of being abutted with the lever 24. Plural pin holes 27 are provided in the revolving trunk 22 along the circumferential direction. By inserting and taking the stopper pin 33 into and from any of the plural pin holes 27, an attachment position with respect to the revolving trunk 22 can be changed.

In such a way, by changing the attachment position of the stopper pin 33 with respect to the revolving trunk 22, it is possible to easily change the turning range of the revolving trunk 22. A material of the stopper pin 33 is anything but metal having a small amount of deformation at the time of an impact is preferable.

In the mechanical stopper device 30, as shown in FIG. 2, for example, when the revolving trunk 22 rotates anti-clockwise, the stopper pin 33 is then abutted with a left side surface of the lever 24, and the lever 24 swings and rotates anti-clockwise about the support shaft 23. When the revolving trunk 22 exceeds a prefixed limit of a rotation amount, the lever 24 collides with the elastic body 25 on one side (on the right side in the figure). By being elastically deformed, the elastic body 25 absorbs motion energy of the revolving trunk 22 and stops rotation of the revolving trunk 22.

Similarly, when the revolving trunk 22 rotates clockwise, the stopper pin 33 is then abutted with a right side surface of the lever 24, and the lever 24 swings and rotates clockwise about the support shaft 23. When the revolving trunk 22 exceeds the prefixed limit of the rotation amount, the lever 24 collides with the elastic body 25 on the other side (on the left side in the figure). By being elastically deformed, the elastic body 25 absorbs the motion energy of the revolving trunk 22 and stops the rotation of the revolving trunk 22.

In the mechanical stopper device 30, by stopping the rotation of the revolving trunk 22 via the lever 24 capable of swinging within the movable range of 50 to 90°, rotation with which a relative total rotation amount exceeds 360° is possible.

Meanwhile, when the revolving trunk 22 is radically stopped, a load is applied to the entire welding robot 10 by inertia force. In particular, a load applied to the welding torch 13 serving as the end effector arranged on a leading end of an arm becomes remarkable. Thus, there is a need for providing a running distance to some extent after collision (contact) between the lever 24 and the elastic body 25 until the revolving trunk 22 becomes stationary, so as to suppress the load applied to the welding torch 13.

In the mechanical stopper device 30 of the present embodiment, a ratio between a distance a from a fulcrum of the lever 24 (center of the support shaft 23) to an abutment position between the lever 24 and the stopper pin 33 (center of the stopper pin 33), and a distance b along the lever 24 center from the fulcrum of the lever 24 to an abutment position between the lever 24 and the elastic body 25 at a center of the elastic body is set within a range of $1.05 \le a/b \le 2.30$, and thickness D of the elastic body 25 is set to 20 mm$\le$D$\le$40 mm. Thereby, while ensuring a proper running distance so as to suppress the load applied to the welding torch 13, the durability of the elastic body 25 is ensured.

That is, by setting a/b to 1.05 or more, a proper running distance by elastic deformation of the elastic body 25 after collision between the lever 24 and the elastic body 25 is ensured. However, when a/b exceeds 2.30, the running distance is increased but impact force applied to the elastic body 25 is excessively increased. Thus, there is a possibility that breakage such as detachment of the elastic body 25 occurs. Therefore, $1.05 \le a/b \le 2.30$ is set.

When the thickness D of the elastic body 25 becomes less than 20 mm, an elastic deformation amount of the elastic body 25 is decreased, and it is not possible to sufficiently ensure the running distance. When the thickness exceeds 40 mm, the running distance is increased but by impact force, a possibility that damage such as detachment of the elastic body 25 occurs is increased. Therefore, by setting to 20 mm$\le$D$\le$40 mm, while ensuring the durability of the elastic body 25, the running distance is earned.

Depth of the recessed groove 26b from and to which the elastic body 25 projects and is fixed is designed so that when the lever 24 collides with the elastic body 25, the lever 24 is not brought into contact with the side wall 26a.

Preferably, a contact area between the lever 24 and the elastic body 25 is 300 to 3,000 mm$^2$. When the contact area is 300 mm$^2$ or more, it is possible to reduce a load per unit area at the time of collision between the elastic body 25 and the lever 24 so as to ease an impact. When the contact area is 3,000 mm$^2$ or less, the mechanical stopper device 30 can be downsized, and it is preferable from a viewpoint of an installment space. Further, a ratio D/S between the thickness D of the elastic body 25 and the contact area S is more preferably 0.006 to 0.13.

Preferably, hardness of a contact portion of the lever 24 to be abutted with the elastic body 25 is more than the elastic body 25. When the lever 24 is abutted with the elastic body 25, by the elastic body 25 being elastically deformed, it is possible to ensure the running distance while ensuring impact force.

As described above, with the mechanical stopper device 30 of the embodiment, the base portion 21 serving as the fixed body includes the fixed side stopper 31 having the lever 24 capable of swinging about the support shaft 23 which is provided in the base portion 21, and the pair of elastic bodies 25 attached to the base portion 21 on both the sides of the swinging direction of the lever 24, the elastic bodies being capable of being abutted with both the side surfaces in the swinging direction of the lever 24, and the revolving trunk 22 serving as the rotating body includes the stopper pin 33 capable of being abutted with both the side surfaces of the lever 24. The ratio between the distance a from the fulcrum of the lever 24 to the abutment position between the lever 24 and the stopper pin 33, and the distance b from the fulcrum of the lever 24 to the abutment position between the lever 24 and the elastic body 25 is $1.05 \le a/b \le 2.30$, and the thickness D of the elastic body 25 is 20 mm$\le$D$\le$40 mm. Thus, by properly setting the ratio of a/b, while ensuring the running distance of the revolving trunk 22, it is possible to absorb impact force by the elastic body 25 having proper thickness so as to more reliably prevent damage to the industrial robot 10, and to improve the life of the mechanical stopper device 30 itself.

The contact area between the lever 24 and the elastic body 25 is 300 to 3,000 mm$^2$. Thus, it is possible to reduce a required installment area of the elastic body 25 so as to make installment of the elastic body easier, and to reduce impact force per unit area so as to suppress damage to the elastic body 25.

The hardness of the contact portion of the lever 24 to be abutted with the elastic body 25 is more than the elastic body 25. Thus, by the elastic body 25 being elastically deformed at the time of collision, it is possible to ensure the running distance of the revolving trunk 22.

The movable range ß of the lever 24 is 50 to 90°, and the lever 24 is abutted with the elastic body 25 within the movable range of the lever 24. Thus, it is possible to set a rotation angle of the revolving trunk 22 to an angle exceeding 360°.

The above mechanical stopper device 30 is arranged between the base portion 21 and the revolving trunk 22 of the industrial robot 10. Thus, it is possible to reduce an excessive load applied to the end effector 13 such as the welding torch installed on the leading end of the industrial robot 10, so as to reliably prevent a failure or origin displacement of the end effector 13.

The present invention is not limited to the embodiment described above but can be appropriately deformed, improved, etc.

For example, the mechanical stopper device of the present invention is not limited to the one arranged in the first shaft J1 of the present embodiment but may be arranged in each of the second shaft J2 to the sixth shaft J6. In that case, in each of the second shaft J2 to the sixth shaft J6, the fixed body and the rotating body are moved together, but a member on the side near the installment surface G serves as the fixed body and a member on the side distant from the installment surface G, the member to be driven by the drive motor 11 serves as the rotating body.

EXAMPLES

In order to prove effectiveness of the present invention, stop tests were performed under various conditions in which the distance a from the fulcrum of the lever to the abutment position between the lever and the movable side stopper, the distance b from the fulcrum of the lever to the abutment position between the lever and the elastic body, the movable range of the lever, the thickness D of the elastic body, the contact area between the elastic body and the lever (elastic body contact area), the materials (hardness) of the lever and the elastic body, and the shape of the colliding surface of the elastic body are changed.

In the stop tests, after the lever collided with the elastic body ten times at high speed, the origin displacement of the torch and a state of the elastic body were visually confirmed, and evaluation was made according to the following evaluation criteria.

Origin displacement of torch: no origin displacement "○", and origin displacement "x"

State of elastic body: no change "○", worn but usable "Δ", and not usable due to detachment, etc. "x"

Test results are shown in Table 1 together with the test conditions.

TABLE 1

| No. | Distance (a) between collision position of stopper and lever fulcrum (mm) | Distance (b) between collision position of elastic body and lever fulcrum (mm) | Ratio of distance (a/b) | Lever movable range (°) | Elastic body thickness D (mm) | Elastic body contact area (contact area with lever) (mm$^2$) | Elastic body material |
|---|---|---|---|---|---|---|---|
| EX. 1 | 90 | 70 | 1.29 | 70 | 30 | 1,256 | Urethane |
| EX. 2 | 110 | 70 | 1.57 | 70 | 30 | 1,256 | Urethane |
| EX. 3 | 135 | 70 | 1.93 | 70 | 30 | 1,256 | Urethane |
| EX. 4 | 135 | 60 | 2.25 | 70 | 30 | 1,256 | Urethane |
| EX. 5 | 90 | 75 | 1.20 | 70 | 30 | 1,256 | Urethane |
| EX. 6 | 90 | 85 | 1.06 | 70 | 30 | 1,256 | Urethane |
| EX. 7 | 90 | 70 | 1.29 | 70 | 20 | 1,256 | Urethane |
| EX. 8 | 90 | 70 | 1.29 | 70 | 40 | 1,256 | Urethane |
| EX. 9 | 90 | 70 | 1.29 | 70 | 30 | 1,600 | Urethane |
| EX. 10 | 90 | 70 | 1.29 | 70 | 30 | 314 | Urethane |
| EX. 11 | 90 | 70 | 1.29 | 70 | 30 | 2,826 | Urethane |
| EX. 12 | 90 | 70 | 1.29 | 70 | 30 | 3,316 | Urethane |
| EX. 13 | 90 | 70 | 1.29 | 70 | 30 | 177 | Urethane |
| EX. 14 | 90 | 70 | 1.29 | 70 | 30 | 1,256 | Urethane |
| EX. 15 | 90 | 70 | 1.29 | 50 | 30 | 1,256 | Urethane |
| EX. 16 | 90 | 70 | 1.29 | 90 | 30 | 1,256 | Urethane |
| EX. 17 | 90 | 70 | 1.29 | 95 | 30 | 1,256 | Urethane |
| EX. 18 | 90 | 70 | 1.29 | 45 | 30 | 1,256 | Urethane |
| EX. 19 | 90 | 70 | 1.29 | 70 | 30 | 1,250 | Acryl |
| COM. 1 | 90 | 35 | 2.57 | 70 | 30 | 1,256 | Urethane |
| COM. 2 | 90 | 90 | 1.00 | 70 | 30 | 1,256 | Urethane |
| COM. 3 | 90 | 70 | 1.29 | 70 | 10 | 1,256 | Urethane |
| COM. 4 | 90 | 70 | 1.29 | 70 | 50 | 1,256 | Urethane |
| COM. 5 | 90 | 35 | 2.57 | 70 | 50 | 1,256 | Urethane |

| No. | Lever material | Hardness comparison between elastic body and lever *1 | Colliding surface shape of elastic body | Evaluation Origin displacement of torch *2 | Evaluation State of elastic body *3 | Note |
|---|---|---|---|---|---|---|
| EX. 1 | Iron | ○ | Circular | ○ | ○ | |
| EX. 2 | Iron | ○ | Circular | ○ | ○ | |
| EX. 3 | Iron | ○ | Circular | ○ | ○ | |
| EX. 4 | Iron | ○ | Circular | ○ | ○ | |
| EX. 5 | Iron | ○ | Circular | ○ | ○ | |
| EX. 6 | Iron | ○ | Circular | ○ | ○ | |
| EX. 7 | Iron | ○ | Circular | ○ | ○ | |
| EX. 8 | Iron | ○ | Circular | ○ | ○ | |
| EX. 9 | Iron | ○ | Square | ○ | ○ | |
| EX. 10 | Iron | ○ | Circular | ○ | ○ | |
| EX. 11 | Iron | ○ | Circular | ○ | ○ | |
| EX. 12 | Iron | ○ | Circular | ○ | ○ | difficult to install elastic body |

TABLE 1-continued

| | | | | | | | |
|---|---|---|---|---|---|---|---|
| EX. 13 | Iron | ○ | Circular | ○ | Δ | |
| EX. 14 | Natural rubber * (colliding part) | x | Circular | ○ | ○ | movable range reduced |
| EX. 15 | Iron | ○ | Circular | ○ | ○ | |
| EX. 16 | Iron | ○ | Circular | ○ | ○ | |
| EX. 17 | Iron | ○ | Circular | ○ | Δ | |
| EX. 18 | Iron | ○ | Circular | ○ | ○ | movable range reduced |
| EX. 19 | Iron | ○ | Circular | ○ | ○ | |
| COM. 1 | Iron | ○ | Circular | ○ | x | |
| COM. 2 | Iron | ○ | Circular | x | Δ | |
| COM. 3 | Iron | ○ | Circular | x | Δ | |
| COM. 4 | Iron | ○ | Circular | ○ | x | movable range reduced |
| COM. 5 | Iron | ○ | Circular | ○ | x | |

*1: elastic body < lever "○", and elastic body > lever "x"
*2: no origin displacement "○", and origin displacement "x"
*3: no change "○", worn but usable "Δ", and not usable due to detachment, etc. "x"

As shown in Table 1, in both Comparative Example 1 and Comparative Example 5 in which the ratio a/b between the distance a from the fulcrum of the lever to the abutment position between the lever and the movable side stopper, and the distance b from the fulcrum of the lever to the abutment position between the lever and the elastic body exceeds an upper limit value (2.30), the state of the elastic body is "x". In Comparative Example 2 in which a/b is less than a lower limit value (1.05) of the present invention, the origin displacement of the torch was found ("x"), and the state of the elastic body was "Δ".

In Comparative Example 4 in which the thickness D of the elastic body exceeds an upper limit value (40 mm) of the present invention, the state of the elastic body was "x", and a movable range of the revolving trunk 22 was narrowed. In Comparative Example 3 in which the thickness D of the elastic body was less than a lower limit value (20 mm) of the present invention, the origin displacement of the torch was found "x", and the state of the elastic body was "Δ".

Meanwhile, in Examples 1 to 19 in which the value of a/b and the thickness of the elastic body were within the range of the present invention, no origin displacement of the torch was found "○", and the state of the elastic body was "○" or "Δ". Thus, effectiveness of the present invention was confirmed.

When comparing Example 16 in which the movable range ß of the lever is 90° and Example 17 in which the movable range exceeds 90°, the state of the elastic body was "○" in Example 16 whereas the state of the elastic body was "Δ" in Example 17. In Example 15 in which the movable range ß of the lever is 50° and Example 18 in which the movable range is less than 50°, favorable results were obtained under both the conditions. However, in Example 18, the movable range of the revolving trunk 22 was narrowed and it is not preferable.

Therefore, it is found that the movable range of the lever 24 of 50 to 90° is preferable.

In both Example 11 in which the elastic body contact area is close to 3,000 mm² and Example 12 in which the elastic body contact area exceeds 3,000 mm², the origin displacement of the torch and the state of the elastic body were favorable under both the conditions. However, in Example 12, a wide area is required for installment of the elastic body and restriction on the installment space is large. Meanwhile, when comparing Example 10 in which the elastic body contact area is close to 300 mm² and Example 13 in which the elastic body contact area is less than 300 mm², the state of the elastic body is "○" in Example 10 whereas the state of the elastic body is "Δ" in Example 13.

Therefore, it is found that the contact area between the lever 24 and the elastic body 25 of 300 to 3,000 mm² is preferable.

In Example 14 in which by making the colliding part of the lever 24 of natural rubber, elastic body hardness>lever hardness is provided, the origin displacement of the torch and the state of the elastic body were both favorable. However, the movable range of the revolving trunk 22 was narrowed.

Therefore, it is found that the hardness of the contact portion of the lever 24 more than the elastic body is preferable.

The present invention is based on Japanese Patent Application (No. 2016-182145) filed on Sep. 16, 2016, and contents thereof are taken herein as a reference.

EXPLANATION OF REFERENCE NUMERALS

10 Welding robot (industrial robot)
13 Welding torch (end effector)
21 Base portion (fixed body)
22 Revolving trunk (rotating body)
23 Support shaft (fulcrum of lever)
24 Lever
25 Elastic body
27 Pin hole
30 Mechanical stopper device
31 Fixed side stopper
33 Stopper pin (movable side stopper)
a Distance from fulcrum of lever to abutment position between lever and movable side stopper
b Distance from fulcrum of lever to abutment position between lever and elastic body
D Thickness of elastic body

The invention claimed is:

1. A mechanical stopper device provided between a fixed body and a rotating body to rotate with respect to the fixed body about a rotation axis, wherein
the fixed body includes a fixed side stopper having a lever capable of swinging in a direction about a fulcrum which is provided in the fixed body, and a pair of elastic bodies attached to the fixed body on both sides of the swinging direction of the lever, the elastic bodies being capable of being abutted with both side surfaces in the swinging direction of the lever, the rotating body includes a movable side stopper capable of being abutted with both of the side surfaces of the lever, a ratio between a distance a from the fulcrum of the lever to an abutment position between the lever and the movable side stopper, and a distance b along the lever center from the fulcrum of the lever to an abutment position between the lever and each of the elastic bodies is 1.05≤a/b≤2.30, and thickness D of each of the elastic bodies is 20 mm≤D≤40 mm.

2. The mechanical stopper device according to claim 1, wherein
a movable range of the lever is 50 to 90°, and
the lever is abutted with each of the elastic bodies within the movable range of the lever.

3. The mechanical stopper device according to claim 1, wherein
a contact area between the lever and each of the elastic bodies is 300 to 3,000 mm².

4. The mechanical stopper device according to claim 3, wherein
hardness of a contact portion of the lever to be abutted with each of the elastic bodies is more than each of the elastic bodies.

5. The mechanical stopper device according to claim 3, wherein
a movable range of the lever is 50 to 90°, and
the lever is abutted with each of the elastic bodies within the movable range of the lever.

6. The mechanical stopper device according to claim 1, wherein
hardness of a contact portion of the lever to be abutted with each of the elastic bodies is more than each of the elastic bodies.

7. The mechanical stopper device according to claim 6, wherein
a movable range of the lever is 50 to 90°, and
the lever is abutted with each of the elastic bodies within the movable range of the lever.

8. A robot, wherein
the mechanical stopper device according to claim 1 is arranged between a base portion of the robot serving as the fixed body, and a revolving trunk serving as the rotating body.

* * * * *